United States Patent
Imai

(10) Patent No.: US 7,895,373 B2
(45) Date of Patent: Feb. 22, 2011

(54) ELECTRONIC DEVICE FOR DATA ACCESS MANAGEMENT

(75) Inventor: Satoshi Imai, Osaka (JP)

(73) Assignee: Kyocera Mita (JP)

( * ) Notice: Subject to any disclaimer, the term of this patent is extended or adjusted under 35 U.S.C. 154(b) by 364 days.

(21) Appl. No.: 12/124,366

(22) Filed: May 21, 2008

(65) Prior Publication Data

US 2008/0294598 A1 Nov. 27, 2008

(30) Foreign Application Priority Data

May 22, 2007 (JP) .............................. 2007-135281

(51) Int. Cl.
*G06F 3/00* (2006.01)
*G06F 5/00* (2006.01)

(52) U.S. Cl. ........................................ 710/36; 370/468
(58) Field of Classification Search .................. 710/36, 710/45
See application file for complete search history.

(56) References Cited

U.S. PATENT DOCUMENTS

| | | | | |
|---|---|---|---|---|
| 6,078,958 | A * | 6/2000 | Echeita et al. | 709/226 |
| 6,912,225 | B1 * | 6/2005 | Kohzuki et al. | 370/412 |
| 7,023,799 | B2 * | 4/2006 | Takase et al. | 370/230.1 |
| 7,272,149 | B2 * | 9/2007 | Bly et al. | 370/414 |
| 7,274,691 | B2 * | 9/2007 | Rogers | 370/389 |
| 7,577,162 | B2 * | 8/2009 | Liaw et al. | 370/468 |
| 7,586,944 | B2 * | 9/2009 | Messick et al. | 370/468 |
| 2002/0114334 | A1 * | 8/2002 | Yang | 370/395.1 |
| 2004/0213259 | A1 * | 10/2004 | Porter | 370/395.2 |
| 2007/0214279 | A1 * | 9/2007 | Choi et al. | 709/231 |

FOREIGN PATENT DOCUMENTS

| | | |
|---|---|---|
| JP | 2000-222258 | 8/2000 |
| JP | 2000-242458 | 9/2000 |
| JP | 2002-358259 | 12/2002 |
| JP | 2003-122704 | 4/2003 |
| JP | 2004-104212 | 4/2004 |

OTHER PUBLICATIONS

Shoji Ogura, IPSJ SIG Techincal Report—Examination of the job execution on VM in Grid Environment, p. 25 right line 6-p. 26 right line 4.
Eiji Yamakoshi, Computer & Network LAN, Load Balancing of Intranet QoS server and band control method, p. 24, left line 11-p. 25, right line 8.

* cited by examiner

*Primary Examiner*—Henry W Tsai
*Assistant Examiner*—Elias Mamo
(74) *Attorney, Agent, or Firm*—Stephen M. Chin; von Simson & Chin LLP

(57) ABSTRACT

An application makes a processor issue a first file access command to a middleware in order to access a file. In response to the first file access command, the middleware makes the processor periodically determine whether file access operation having a higher priority level than file access operation involved with the first file access command is being performed and, in the case where an affirmative determination is made, issue a second file access command corresponding to the first file access command within redundant bandwidth obtained by subtracting guaranteed bandwidth of the high-priority file access from the maximum bandwidth available for accessing the file storage.

4 Claims, 8 Drawing Sheets

ELECTRONIC DEVICE FOR DATA ACCESS MANAGEMENT

CROSS-REFERENCE TO RELATED APPLICATIONS

This application relates to and claims priority rights from Japanese Patent Application No. 2007-135281, filed on May 22, 2007, the entire disclosure of which is hereby incorporated by reference herein.

BACKGROUND OF THE INVENTION

1. Field of the Invention

The present invention relates to an electronic device provided with a file storage (auxiliary storage unit) and, particularly, to an electronic device in which two or more file accesses to the file storage made conflict with each other.

2. Description of the Related Art

In the case where two or more file access requests from applications to the same storage means made conflict with each other in an existing file system provided by an operating system, the access operations with respect to the storage means are processed in a time-division manner in general. FIG. 8 shows a file access operation state in a file system in the case where two or more file access requests from applications made conflict with each other. Although FIG. 8 shows a portion in which access requests conflict with each other as simultaneous access operations, time-division control is carried out actually.

In this case, two or more file access requests are apparently processed in parallel, which is favorable to a multiple application environment. However, in the parallel processing, the file access speed may decrease and the expected performance may not be attained.

In the case where an image forming apparatus has the configuration as described above, for a file access request requiring real-time processing, such as one relating to a print job, it is preferable to process the request under guaranteeing certain level of bandwidth (referred to as bandwidth guarantee). Further, there may be a case where it is necessary to process a file access request that does not require real-time processing, such as one relating to a setting value change, simultaneously with the file access request requiring real-time processing. The bandwidth for file access refers to the amount of accesses (transfer data amount) to a storage per unit time and is represented as, e.g., 1.5 Gbps.

Jpn. Pat. Appln. Laid-Open Publication No. 2004-104212 discloses a file system in which in the case where two or more file access requests conflict with each other, a file access request having a higher priority level is preferentially processed to thereby guarantee its bandwidth while a file access request having a lower priority level is processed simultaneously.

SUMMARY OF THE INVENTION

Development of a file system forming the basis of a computer system of an image forming apparatus imposes a great burden on application vendors. Such a problem occurs not only in an image forming apparatus but also in other electronic device provided with a file storage.

The present invention has been made in view of the above problem, and an object of the present invention is to provide an electronic device capable of simultaneously processing a file access request having a higher priority level and a file access request having a lower priority level under guaranteeing bandwidth for the file access having a higher priority level without any modification of an existing file system in the case where two or more file access requests to the same storage made conflict with each other.

According to a first aspect of the present invention, there is provided an electronic device including: a processor; a file storage for storing a plurality of files; and a program storage. The program storage stores an application, a middleware, and an existing file system for instructing the processor to perform file access operation on the file storage. The application, the middleware, and the file system operate by the processor.

The application makes the processor issue a first file access command to the middleware in order to access any of the plurality of files.

In response to the first file access command, the middleware makes the processor periodically determine whether file access operation having a higher priority level than file access operation involved with the first file access command is being performed. In the case where an affirmative determination is made, the middleware makes the processor issue to the file system a second file access command corresponding to the first file access command within redundant bandwidth obtained by subtracting guaranteed bandwidth of the high-priority file access from the maximum bandwidth available for accessing the file storage.

The application may be a plurality of applications or an integrated application.

According to the configuration of the first aspect, when two or more file access commands issued from one or more applications to the same file storage conflict with each other, the middleware periodically determines that file access operation having a higher priority level is performed by the file system and issues the second file access command which corresponds to the first file access command within redundant bandwidth obtained by subtracting guaranteed bandwidth of the high-priority file access from the maximum bandwidth available for accessing the file storage. Thus, it is possible to simultaneously process a file access request having a higher priority level and a file access request having a lower priority level under guaranteeing bandwidth for the file access having a higher priority level without any modification of an existing file system in the case where two or more file access requests made to the same storage conflict with each other.

Other objects, features and advantages of the present invention will become more readily apparent from the following description.

DETAILED DESCRIPTION OF THE PREFERRED EMBODIMENTS

First Embodiment

<1> Hardware Configuration

Figure 3:
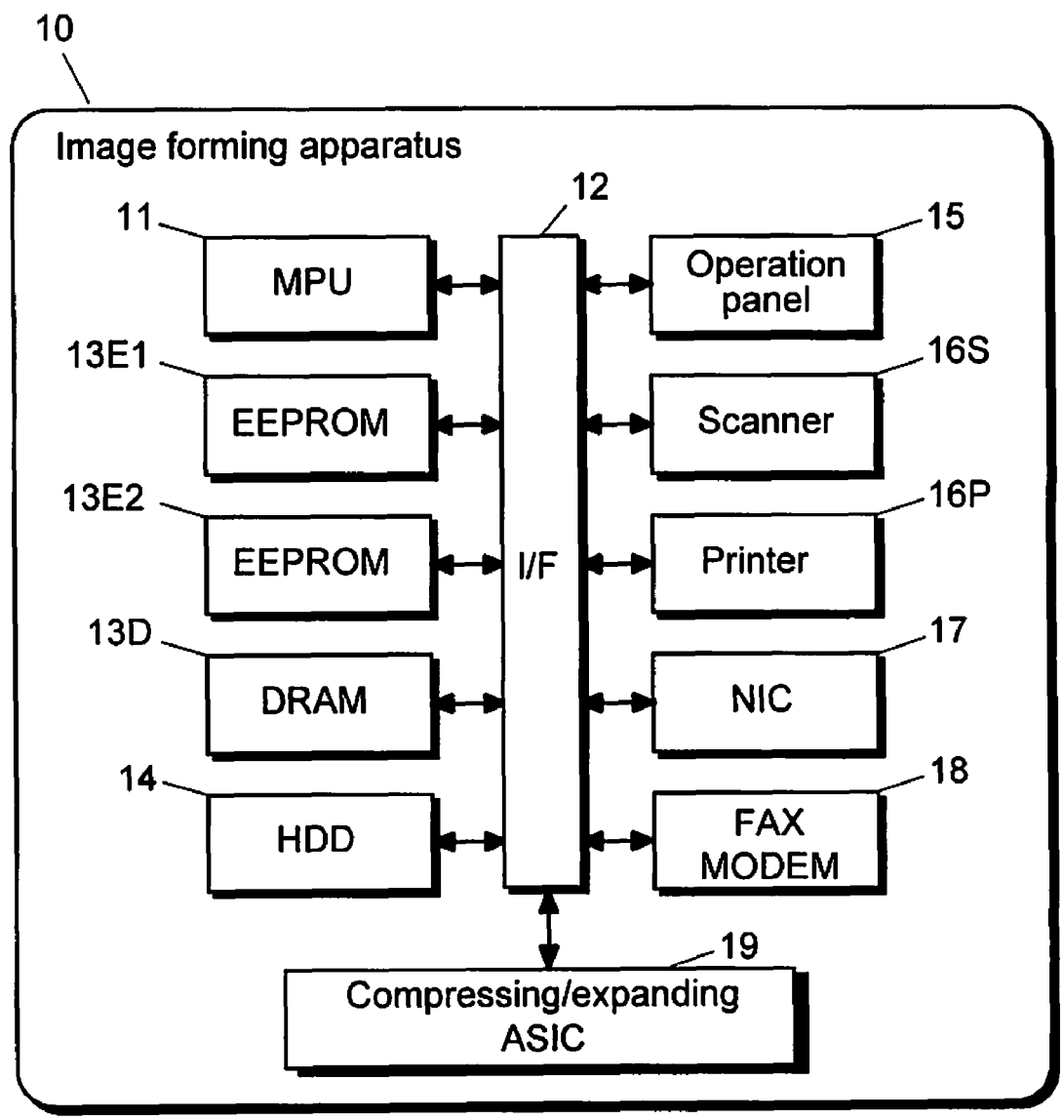
FIG. 3 is a block diagram schematically showing a hardware configuration of the image forming apparatus according to the first embodiment of the present invention.

FIG. 3 is a block diagram schematically showing a hardware configuration of am image forming apparatus 10 according to a first embodiment of the present invention.

In the image forming apparatus 10, an EEPROM 13E1, an EEPROM 13E2, a DRAM 13D, an HDD 14, an operation panel 15, a scanner 16S, a printer 16P, an NIC 17, a facsimile modem 18, and a compressing/expanding ASIC (Application Specific Integrated Circuit) 19 are connected to an MPU 11 through an interface 12. FIG. 3 shows a plurality of interfaces as one block for the sake of simplification.

The EEPROMs 13E1 and 13E2 are, e.g., flash memories. A BIOS (Basic Input Output System) is stored in the EEPROM 13E1. Softwares to be described later are stored in the EEPROM 13E2. The DRAM 13D is used as a working area, and HDD 14 is used as a data storage area.

The scanner 16S is used for an image input in scan operation, copy operation, and facsimile transmission. The printer 16P as an image output unit has a print engine, a fixing unit, a sheet supply section, a sheet feeding section, and a sheet discharge section. In printing operation, the printer 16P forms an electrostatic latent image on the surface of a photoconductor drum as the print engine based on supplied bit map data, develops the electrostatic latent image with a toner, transfers and fixes a toner image onto a recording sheet, and finally discharges the recording sheet onto which the toner image has been fixed.

The NIC 17 is connected to a host computer (not shown) on a network through a wired or wireless communication medium to be used in a print job, E-mail transmission/reception, and Internet facsimile transmission. The facsimile modem 18 is used for the facsimile transmission.

The compressing/expanding ASIC 19 is used as a co-processor of the MPU 11. The compressing/expanding ASIC 19 has two ports respectively for image compression and image expansion and can execute up to four instructions in parallel.

<2> Software Configuration

Figure 2:
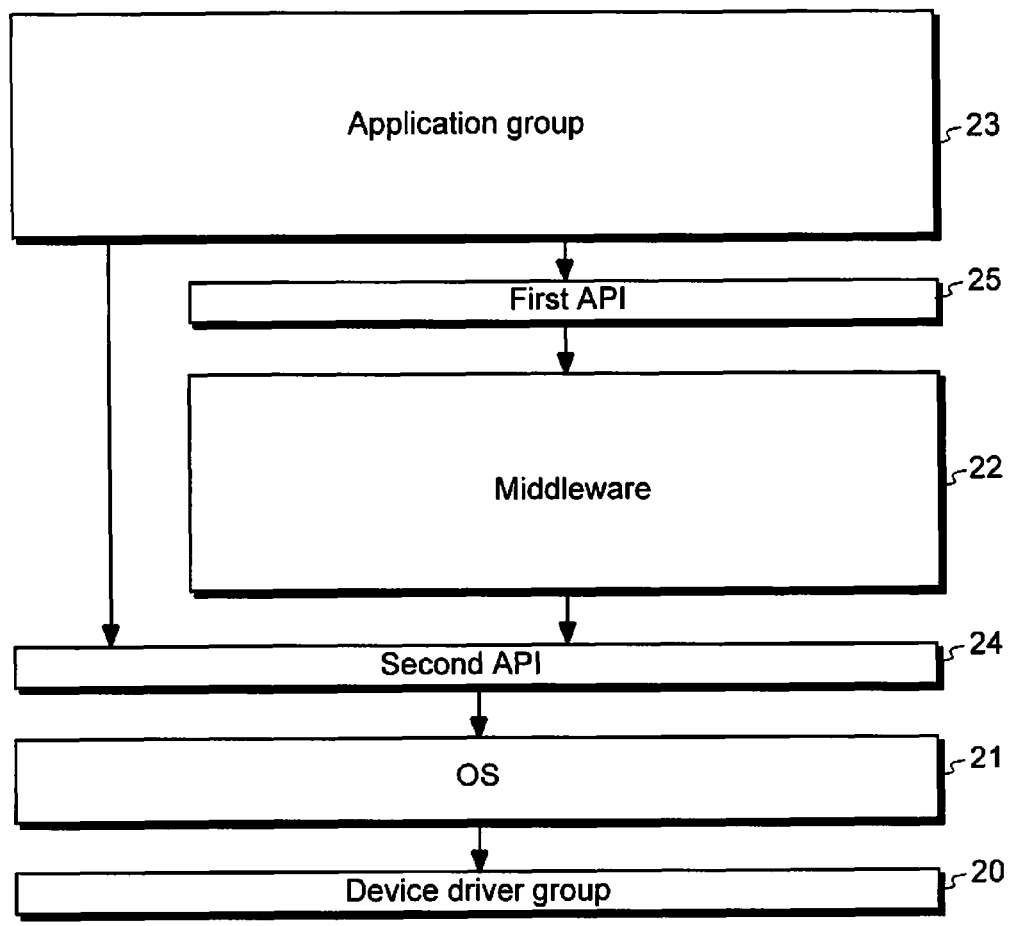
FIG. 2 is a block diagram schematically showing a software layer structure of the image forming apparatus according to the first embodiment of the present invention.

FIG. 2 is a block diagram schematically showing a software layer structure of the image forming apparatus 10 according to the first embodiment of the present invention.

The image forming apparatus 10 has, as software (i.e., computer programs), a device driver group 20, an OS 21, a middleware 22, and an application group 23.

The device driver group 20 is located in the lower layer of the OS 21 and composed of a plurality of device drivers corresponding to various hardware devices.

The OS 21 is a versatile operating system such as Linux (registered trademark) and provides basic functions to the application group 23.

The middleware 22 is software that resides between the application group 23 and OS 21 and uses various basic functions of the OS 21 through a second API (Application Programming Interface) 24 which is an aggregation of functions to provide to the application group 23 higher applied functions than the OS 21 does.

The application group 23 includes a print application, a copy application, and the like and uses various basic functions of the OS 21 through a second API 24 or uses various applicable functions of the middleware 22 through the first API 25.

<3> Main Section Configuration

Figure 1:
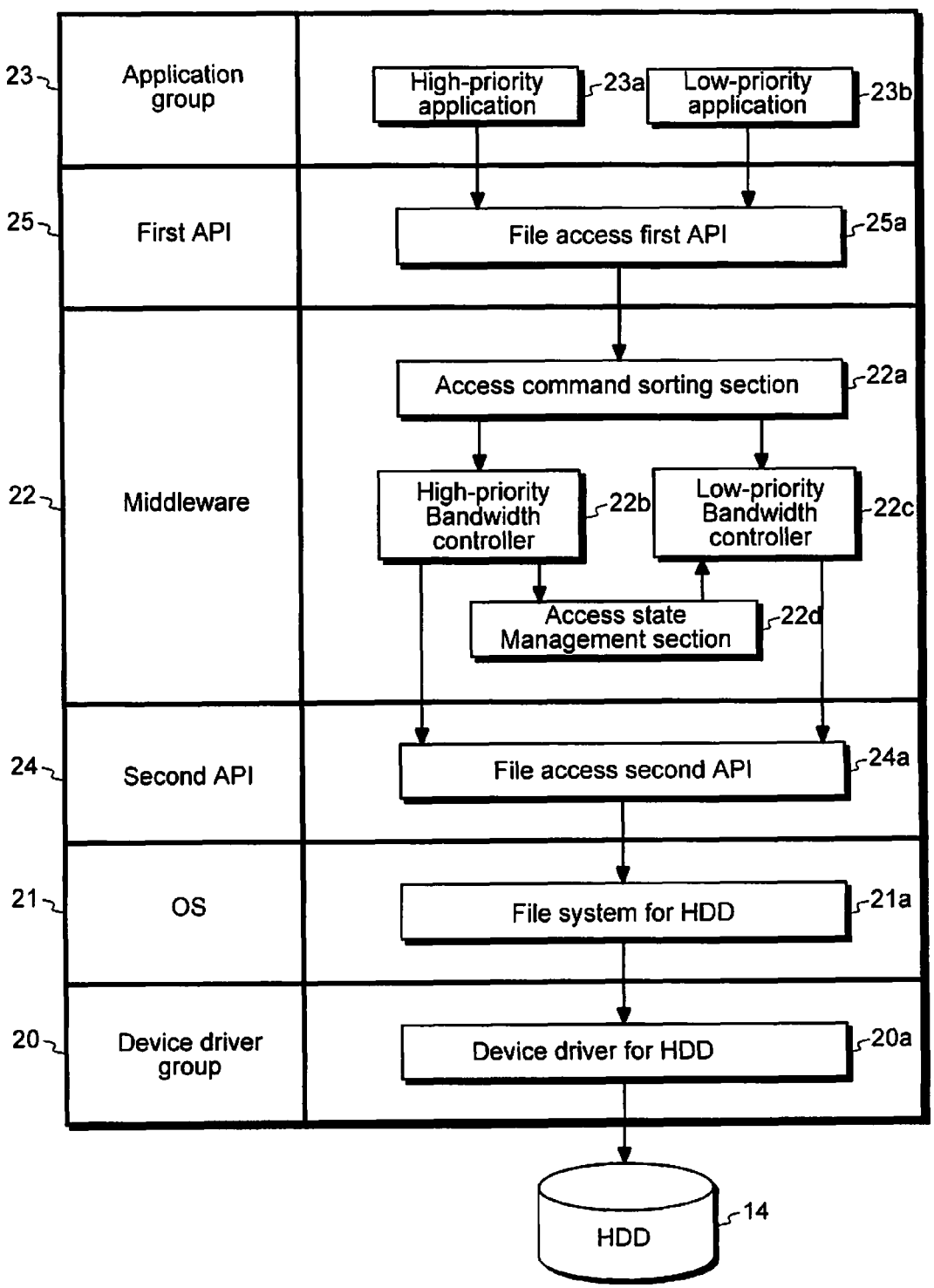
FIG. 1 is a view showing a configuration of a main section of an image forming apparatus according to a first embodiment of the present invention.

FIG. 1 is a view showing a configuration of a main section of the image forming apparatus 10 according to the first embodiment of the present invention.

The image forming apparatus 10 has various software components in order to achieve bandwidth control according to the present invention. More specifically, the image forming apparatus 10 has: a device driver 20a for HDD for controlling the HDD 14 in the device driver group 20; a file system 21a for HDD in the OS 21; an access command sorting section 22a, a high-priority bandwidth controller 22b, a low-priority bandwidth controller 22c, and an access state management section 22d in the middleware 22; and a high-priority application 23a and a low-priority application 23b in the application group 23.

Further, the image forming apparatus 10 has, as callable functions, a file access second API 24a in the second API 24 and a file access first API 25a in the first API 25.

The device driver 20a for HDD is a device driver for controlling the HDD 14.

The file system 21a for HDD manages files stored in the HDD 14. More specifically, the file system 21a for HDD has a function for receiving a file access command instructing file input and output, file generation, or file deletion from the middleware 22 and requesting the device driver 20a for HDD to perform a function corresponding to the command. Further, the file system 21a for HDD provides a file protection function based on the access attribute such as "Readable/writable" or "Write disabled", a check function of access authority according to each user, and the like.

An example of the file access command issued from the middleware 22 to file system 21a for HDD includes those (fopen/fread/fwrite) having a file interface conforming to ANSI-C standard, which are included in the file access second API 24a.

The access command sorting section 22a receives a file access command for the middleware 22 from the application group 23 and determines, according to its priority, to which of the high-priority bandwidth controller 22b or low-priority bandwidth controller 22c the file access command should be transmitted.

An example of the file access command issued from the application group 23 to middleware 22 includes fread_Middle for requesting the middleware 22 to perform file read operation and fwrite_Middle for requesting the middleware 22 to perform file write operation which are newly created in the present invention. The above file access commands are included in the file access first API 24a.

In order to distinguish the file access command issued from the application group 23 to middleware 22 and that issued from the middleware 22 to file system 21a for HDD, the former is referred hereinafter to as "first file access command" and latter as "second file access command".

In order to control the sorting of commands, a priority level is added to the option of the first file access command issued to the middleware 22, and the access sorting section 22a refers to the option to thereby determine the sorting behavior (for example, "p" is set as a high priority option, which is used like this: "fread_Middle-p Tarou.jpg").

When called by the access command sorting section 22a, the high-priority bandwidth controller 22b notifies the access state management section 22d of the start of file access and uses a command of the file access second API 24a to request the file system 21a for HDD to perform file access operation such as reading or writing. Further, when receiving a notification of the completion of the file access from the file system 21a for HDD, the high-priority bandwidth controller 22b notifies the access state management section 22d of the completion of the file access.

When called by the access command sorting section 22a, the low-priority bandwidth controller 22c acquires the access state of the high-priority bandwidth controller 22b from the access state management section 22d and uses a command of the file access second API 24a to request the file system 21a for HDD to perform file access operation such as reading or writing while taking the access state of the high-priority bandwidth controller 22b into consideration in the manner as described later.

The access state management section 22d manages the access state of the high-priority bandwidth controller 22b. Upon reception of the file access start notification, the access state management section 22d stores a value of, e.g., F=1 in a common memory area of the DRAM 13D through the OS 21 and device driver group 20. Upon reception of the file access completion notification, the access state management section 22d stores a value of, e.g., F=0 in this memory area.

The high-priority application 23a is, e.g., a print application. This application 23a reads a file stored in the HDD 14 to execute a print job. The application 23a is previously determined to be preferentially executed. The high priority option (p) is added to the first file access command that the high-priority application 23a issues.

The low-priority application 23b is, e.g., a setting changing application. This application 23b reads a setting file stored in the HDD 14 to execute a job changing the setting. Although a program relating to the setting change may be included in each application or an operation panel application, it is assumed that the program is implemented independently from these applications in the first embodiment.

Figure 4:
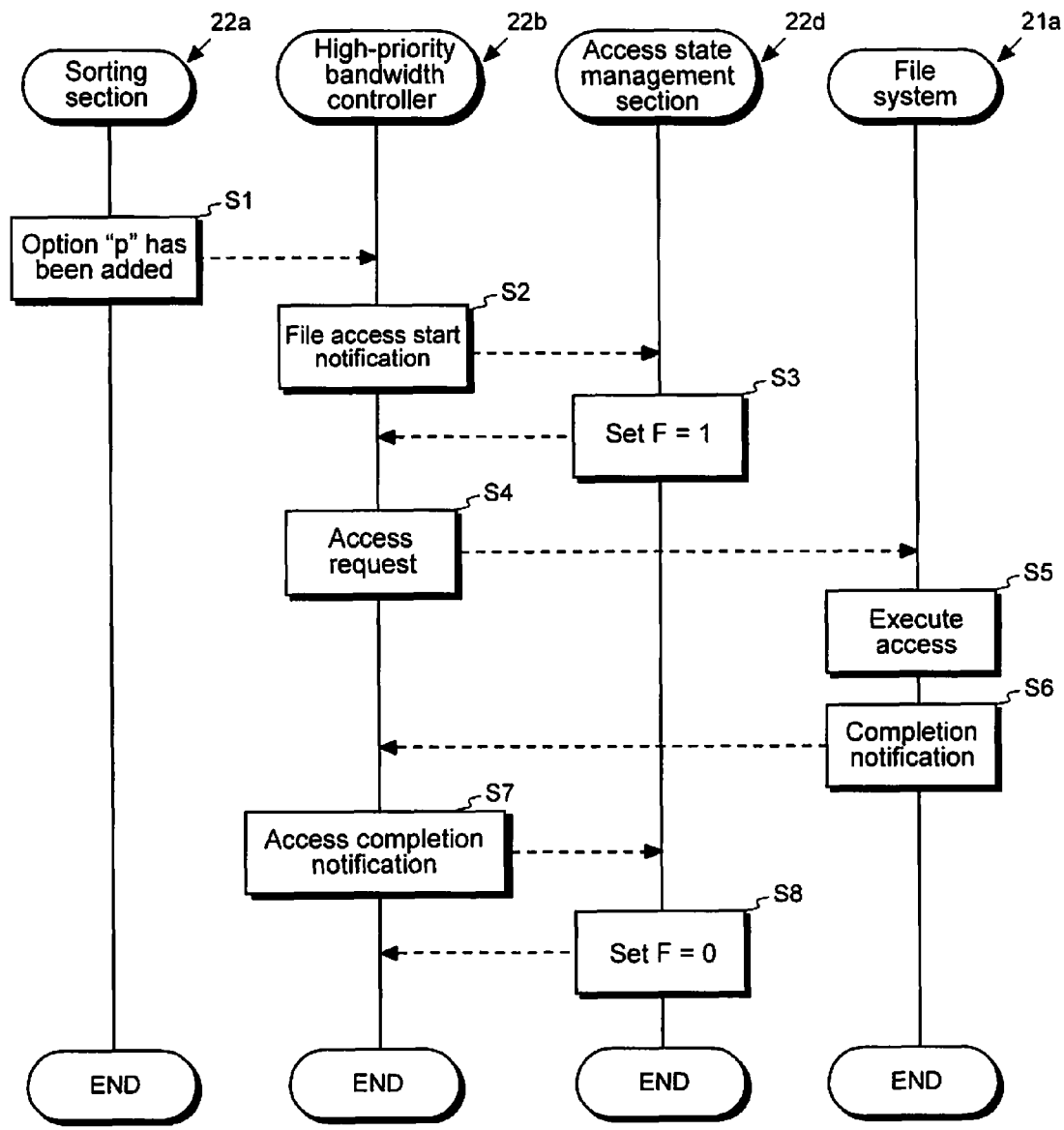
FIG. 4 is a view showing the flow of operation of respective main sections in the case where a first file access command having a higher priority level is issued.

<4> Operation of Main Sections when a
High-Priority First File Access Command is Issued FIG. 4 is a view showing the flow of operation of respective main sections 22a to 22d in the case where a high-priority first file access command is issued from the high-priority application 23a to middleware 22. Each numeral in the parenthesis represents the step number in FIG. 4.

(S1) The access command sorting section 22a receives the first file access command. Then, when determining that the command option "p" has been added to the command, the access command sorting section 22a passes the command to the high-priority bandwidth controller 22b.

(S2) In response to this, the high-priority bandwidth controller 22b notifies the access state management section 22d of the start of the file access (or the high-priority bandwidth controller 22b calls the access state management section 22d).

(S3) In response to the notification, the access state management section 22d stores a value of flag F=1 in a common memory area of the DRAM 13D through the OS 21 and device driver group 20 and notifies the high-priority bandwidth controller 22b of this action (or the access state management section 22d returns the set flag value to the high-priority bandwidth controller 22b).

(S4) In response to this, the high-priority bandwidth controller 22b issues a file access request to the file system 21a for HDD. That is, the high-priority bandwidth controller 22b issues a second file access command corresponding to the first file access command from the high-priority application 23a.

(S5) In response to the issued second file access command, the HDD file system 21a for HDD performs file access operation corresponding to the command through the device driver 20a for HDD.

(S6) Upon completion of the processing corresponding to the second file access command, the file system 21a for HDD notifies the high-priority bandwidth controller 22b of the completion of the processing.

(S7) In response to this, the high-priority bandwidth controller 22b notifies the access state management section 22d of the completion of the file access.

(S8) In response to this, the access state management section 22d stores a value of flag F=0 in a common memory area of the DRAM 13D through the OS 21 and device driver group 20 and notifies the high-priority bandwidth controller 22b of this action.

Figure 5:
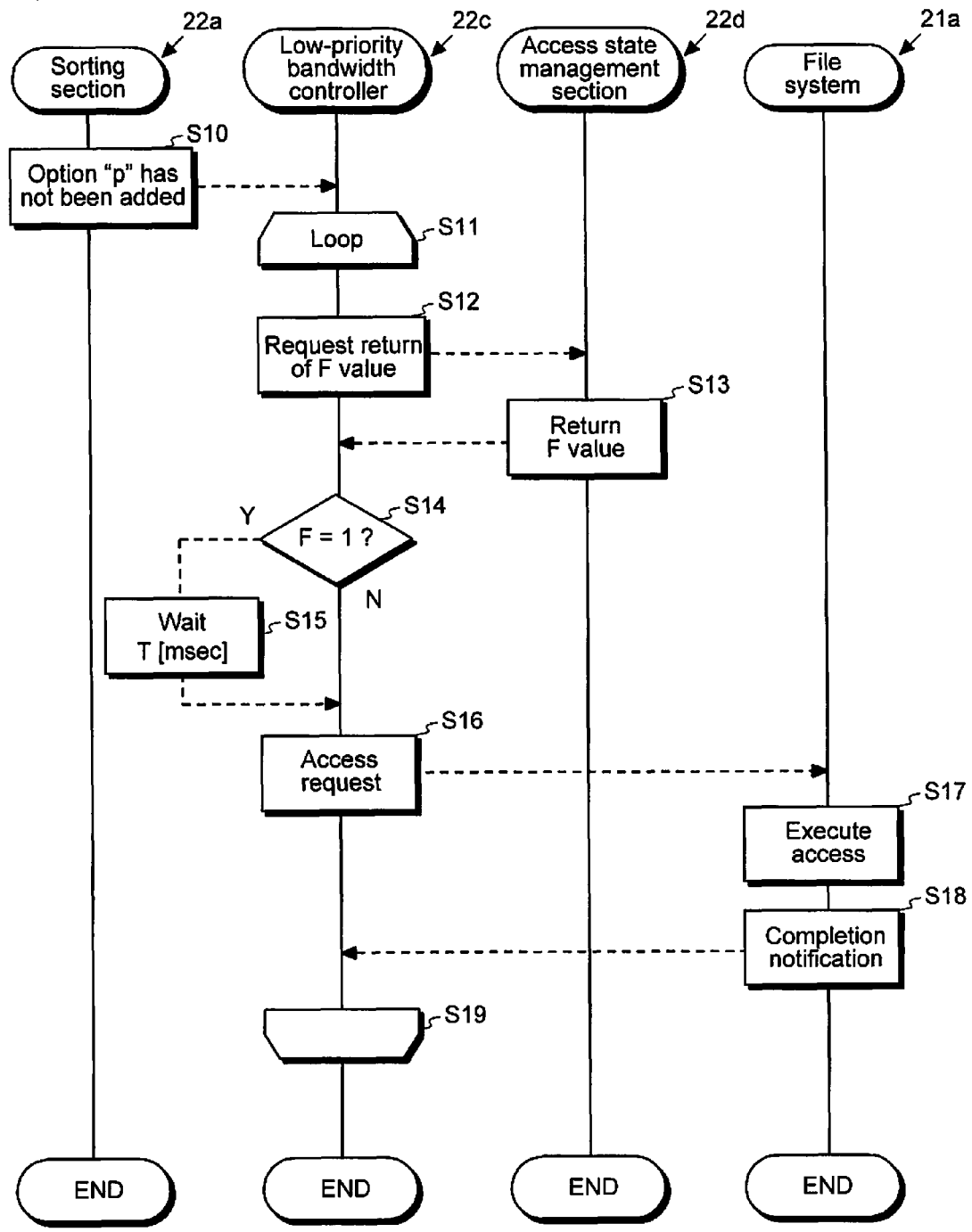
FIG. 5 is a view showing the flow of operation of respective main sections in the case where a first file access command having a lower priority level is issued.

<5> Operation of Main Sections when a
Low-Priority First File Access Command is Issued FIG. 5 is a view showing the flow of operation of respective main sections in the case where a low-priority first file access command is issued from the low-priority application 23b to the middleware 22. Each numeral in the parenthesis represents the step number in FIG. 5.

(S10) The access command sorting section 22a receives the first file access command. Then, when determining that the command option "p" has not been added to the command, the access command sorting section 22a passes the command to the low-priority bandwidth controller 22c.

(S11) Then, in the case where the first file access command is, e.g., a file reading request, the low-priority bandwidth controller 22c repeats the reading operation in the manner as described below until EOF (End Of File) of a target file is reached. In the case where the first file access command is, e.g., a file writing request, the low-priority bandwidth controller 22c repeats the writing operation in the manner as described below until the file size specified by the command is reached.

(S12) The low-priority bandwidth controller 22c requests the access state management section 22d to return the F value.

(S13) In response to this, the access state management section 22d reads the F value set in a common memory area of the DRAM 13D through the OS 21 and device driver group 20 and returns the read value to the low-priority bandwidth controller 22c.

(S14) The low-priority bandwidth controller 22c determines whether the notified F value is 1 or not, that is, whether the high-priority bandwidth controller 22b requests the file system 21a for HDD to perform file access operation. In the case of an affirmative determination, the flow advances to the next step S15. In the case of a negative determination, the flow advances to step S16.

(S15) The low-priority bandwidth controller 22c waits for T1 milliseconds.

(S16) The low-priority bandwidth controller 22c issues a file access command to request the file system 21a for HDD to process only data corresponding to, e.g., 256 bytes in the file specified by the first file access command. That is, the low-priority bandwidth controller 22c issues a second file access command corresponding to the first file access command.

The above wait time "T1" and file access amount (corresponding to access time "T2") are determined such that their bandwidth falls within "Smax−Sa" which is redundant bandwidth obtained by subtracting "Sa" which is bandwidth (referred hereinafter to as guaranteed bandwidth) for guaranteeing file access made by the high-priority application 23a from "Smax" which is the maximum bandwidth available for accessing the HDD 14. Using these values, the file access bandwidth S for the high-priority application 23a can be represented as: $S=Smax \times T1/(T1+T2) \geq Sa$, with the result that $S \geq Sa$ is satisfied.

(S17) In response to the issued second file access command, the file system 21a for HDD performs file access operation corresponding to the command through the device driver 20a for HDD.

(S18) After completion of the processing corresponding to the second file access command, the file system 21a for HDD notifies the low-priority bandwidth controller 22c of the completion of the file access operation.

(S19) The low-priority bandwidth controller 22c repeats the procedure from step S12 to step S16 as long as the loop condition of S11 is true and ends this flow when the loop condition fails.

Figure 6:
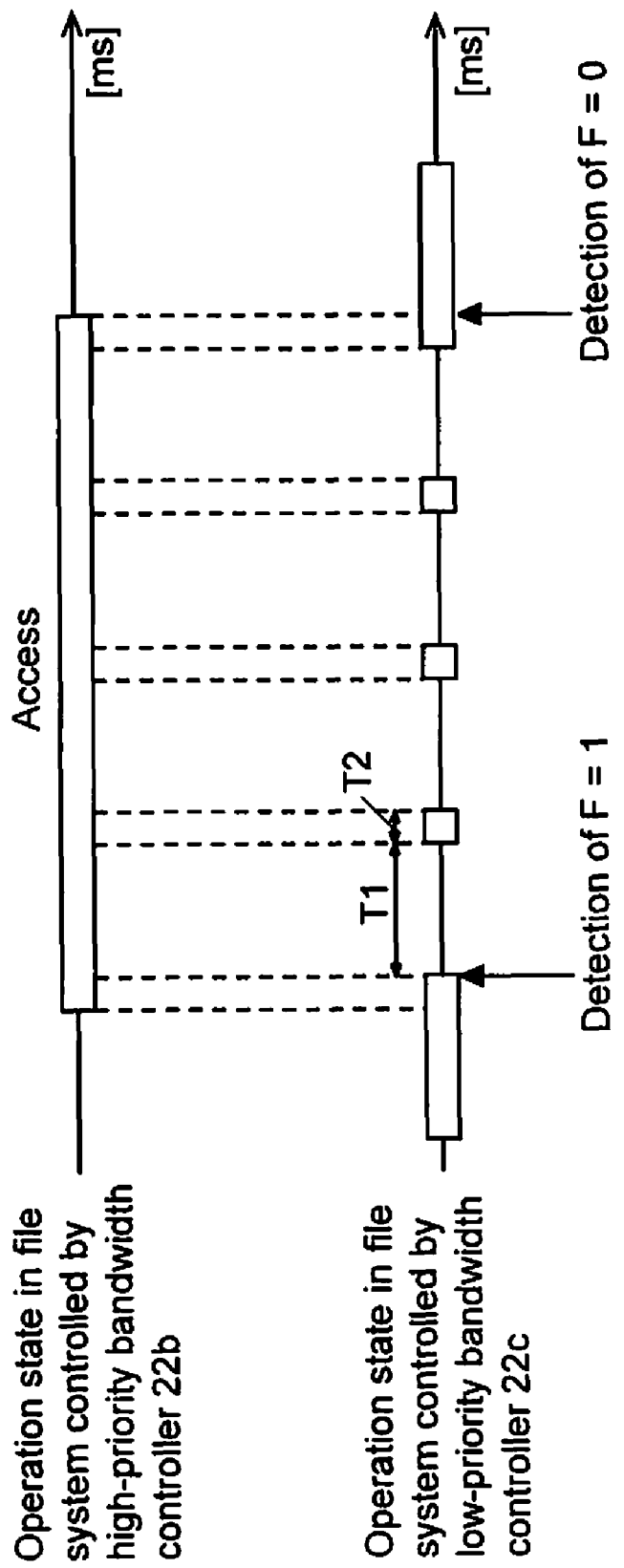
FIG. 6 is a view showing a file access operation state in a file system for HDD according to two priority levels "High" and "Low"

FIG. 6 is a view showing the file access operation state in the file system 21a for HDD in the above operation step S5 and step 17. In FIG. 6, the upper part is the file access operation state in the file system 21a for HDD controlled by the high-priority bandwidth controller 22b and lower part is the file access operation state in the file system 21a for HDD controlled by the low-priority bandwidth controller 22c. Rectangles in the drawing represent that the HDD access operation is being performed.

In the example of FIG. 6, the file access from the low-priority bandwidth controller 22c is processed first. When the file access from the high-priority bandwidth controller 22b is started, the low-priority bandwidth controller 22c determines that the F value is 1, stops the file access, waits for T1 milliseconds, and then performs the file access again for T2 milliseconds. At the time point when the file accesses from the high-priority bandwidth controller 22b and low-priority bandwidth controller 22c are overlapped, time-division parallel processing is performed by the file system 21a for HDD. With this configuration, the file access from the low-priority bandwidth controller 22c can be executed within a range that does not interfere with the guaranteed bandwidth of file access from the high-priority bandwidth controller 22b.

<6> Advantage

With the configuration according to the first embodiment, when two or more file accesses from the application group 23 conflict with each other, the low-priority bandwidth controller 22c in the middleware 22 performs the above bandwidth control, so that it is possible to simultaneously process a high-priority file access and low-priority file access without modification of an existing file system while guaranteeing the high-priority file access bandwidth.

Although it has been impossible to change a setting value during operation of a print job in a typical image forming apparatus, the present invention allows the setting value change processing and the like to be achieved during a print job without delaying the print job.

<7> Modification

It should be understood that the above-described embodiment is an example for describing the present invention and that the present invention is not limited to this basic embodiment, but all changes and modifications made without departing from the technical scope of the present invention are covered by the present invention.

Figure 7:
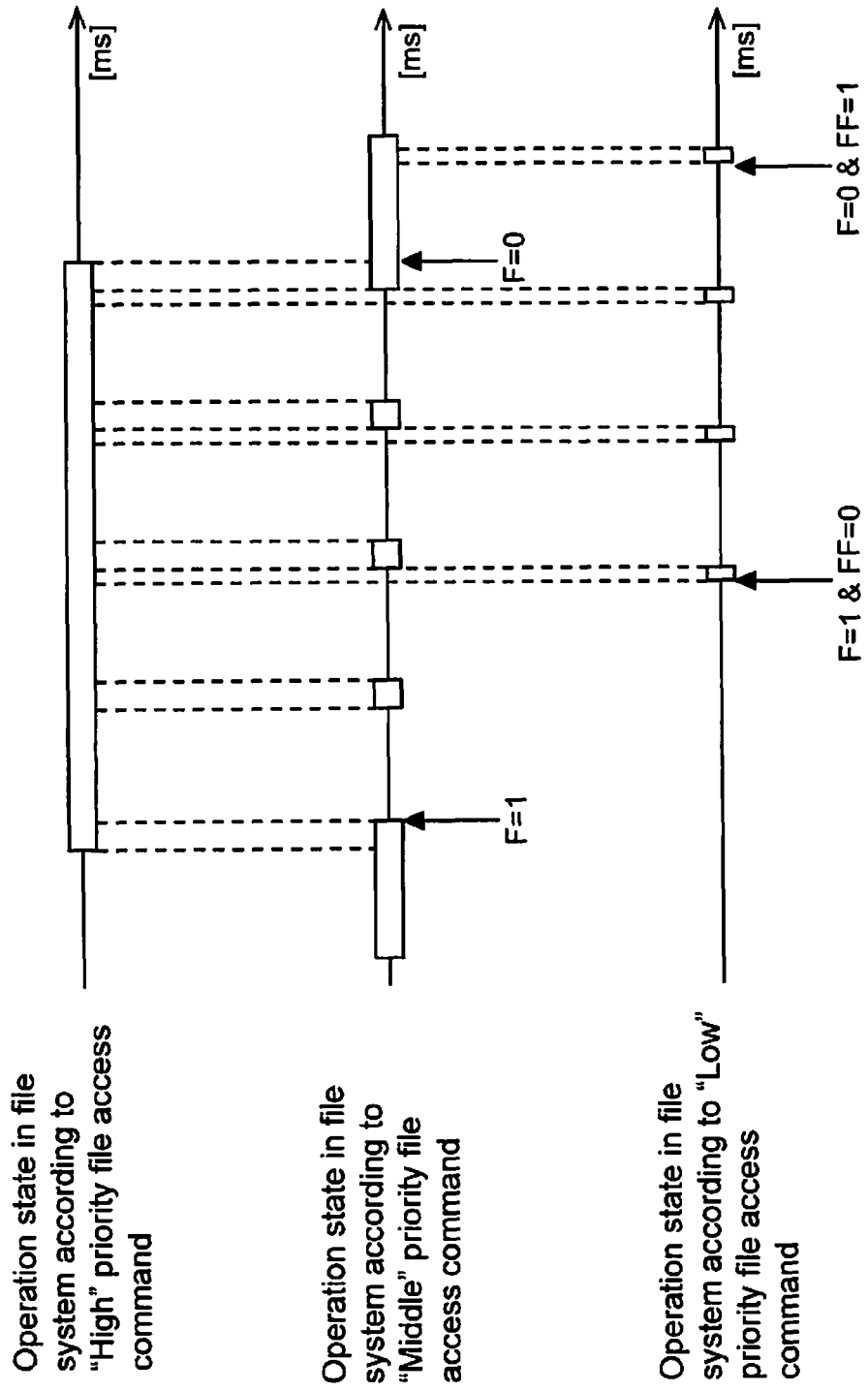
FIG. 7 is a view showing a file access operation state in a file system for HDD according to three priority levels "High", "Medium", and "Low"
Figure 8:
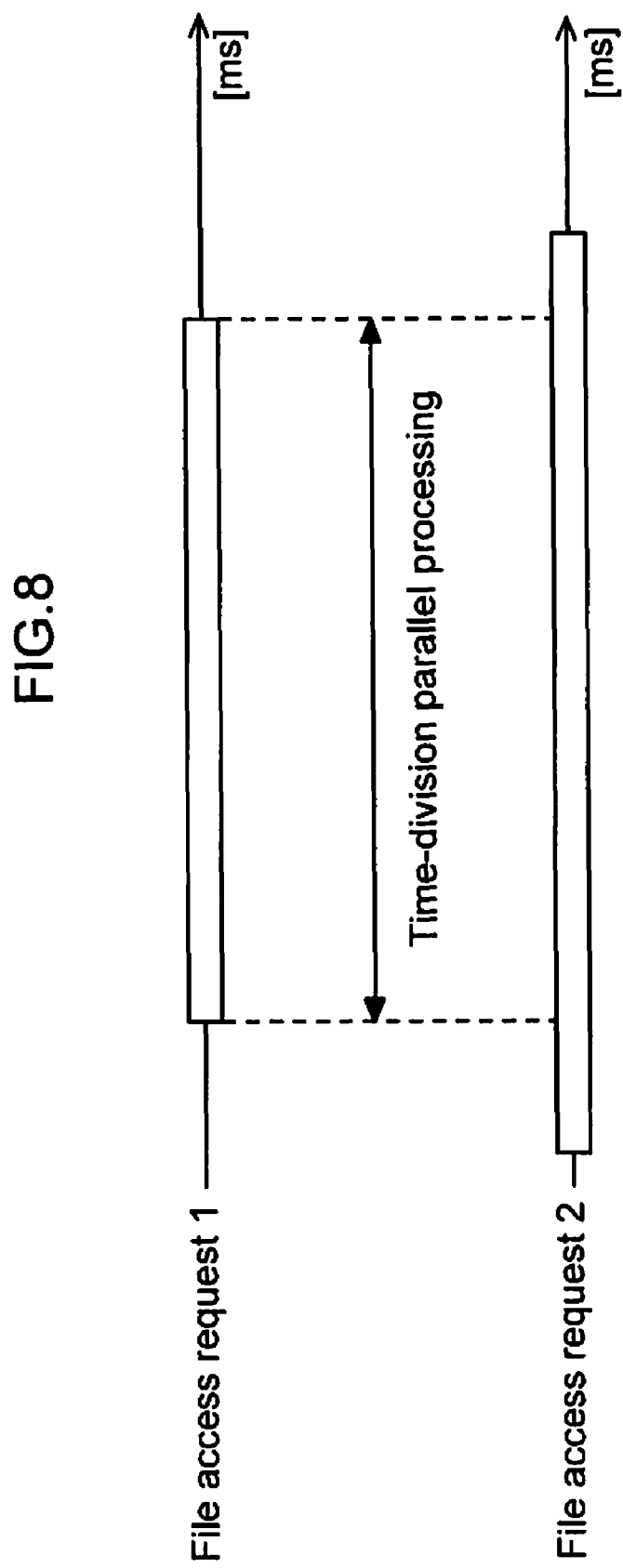
FIG. 8 is a view showing a file access operation state in a file system in the case where two or more file access requests made from an application conflict with each other.

For example, although the bandwidth control of the middleware 22 for the first file access command is performed according to two priority levels "High" and "Low" in the first embodiment, the file access operation may be performed according to three priority levels "High", "Middle", and "Low". FIG. 7 is a view showing a file access operation state in the file system for HDD 21a according to the three priority levels "High", "Medium", and "Low". The control operation of the middleware 22 according to a "High" priority file access command is the same as that shown in FIG. 4. In the control operation of the middleware 22 according to a "Middle" priority file access command, a step in which the start of access operation is notified to the access state management section 22d in the same manner as step S2 shown in FIG. 4 is added before step S11 of FIG. 5. In response to this, the access state management section 22d sets "1" in a flag FF different from the flag F. Further, the control operation of the middleware 22 according to a "Low" priority file access command is performed as follows: in the case where the flag F=0 and flag FF=0, the middleware 22 does not perform the bandwidth control but directly passes the access request to the file system 21a for HDD; in the case where F=1 and FF=0 or F=0 and FF=1, the middleware 22 performs the same processing as that shown in FIG. 5, further determines whether FF=1 in step S14 and, in the case of an affirmative determination, advances to step S15; and in the case where F=1 and FF=1, the middleware 22 performs the same processing as that shown in FIG. 5 but waits for a time longer than the "T1" in step S15 or makes an access request in step S16 such that access time becomes shorter than the access time "T2" in step S17 to thereby guarantee "High" and "Middle" priority file access bandwidth.

The bandwidth control according to the present invention can be applied not only to an image forming apparatus but also to an electronic device of any type as long as it includes the application group 23, the middleware 22, the file system 21a for HDD, the device driver 20a for HDD, and the HDD 14 according to the present invention.

Further, a target (target of file access) of the bandwidth control according to the present invention is not limited to the HDD 14 but may also be applied to an auxiliary storage unit such as an MO (Magneto Optical disk) or a flash memory.

Although the priority is added on an application basis in the first embodiment, the priority may be added on a job basis.

Although the image forming apparatus according to the first embodiment is one with multiple applications, it may be one having an integrated application capable of executing a plurality of jobs by one application.

Further, the functions of the middleware 22 according to the first embodiment may be included in an application itself.

What is claimed is:

1. An electronic device comprising:
a processor;
a file storage for storing a plurality of files; and
a program storage, the program storage storing one or more applications, a middleware, and an existing file system for instructing the processor to perform file access operation on the file storage, the one or more applications, the middleware, and the file system operate by the processor, wherein the application makes the processor issue a first file access command to the middleware in order to access any of the plurality of files, and in response to the first file access command, the middleware makes the processor periodically determine whether file access operation having a higher priority level than file access operation involved with the first file access command is being performed and, in the case where an affirmative determination is made, issue to the file system a second file access command corresponding to the first file access command within redundant bandwidth obtained by subtracting guaranteed bandwidth of the high-priority file access from the maximum bandwidth available for accessing the file storage.

2. The electronic device according to claim 1, further comprising an access information memory for storing access information of the file, wherein the middleware comprises:

a sorting program which makes the processor respond to the issued first file access command and sort the command according to a priority level related to the command;

a first bandwidth control program which makes the processor receive a high-priority first file access command according to the sorting operation, store start information of the high priority file access in the access information memory, and issue a second file access command corresponding to the first file access command to the file system; and a second bandwidth control program which makes the processor receive a low priority first file access command according to the sorting operation, periodically refer to the access information memory to determine whether there is the start information of the high priority file access and, in the case where an affirmative determination is made, issue the second file access command which corresponds to the first file access command and requires only a part of the entire access amount specified by the first file access command within redundant bandwidth obtained by subtracting guaranteed bandwidth of the high-priority file access from the maximum bandwidth available for accessing the file storage.

3. The electronic device according to claim 2, wherein time-division parallel processing is performed when a high-priority file access and a low-priority file access are overlapped in time.

4. An electronic device comprising:

a storage unit for storing a plurality of files;

a first unit that issues a first file access command in order to access any of the plurality of files;

a second unit that responds to the issued first file access command and sorting the command according to a priority level related to the command;

a first bandwidth control unit that receives a high-priority first file access command according to the sorting operation, stores start information of the high priority file access, and issues a second file access command corresponding to the first file access command; and a second bandwidth control unit that receives a low priority first file access command according to the sorting operation, determines whether there is the start information of the high priority file access and, in the case where a negative determination is made, periodically issues a second file access command corresponding to the first file access command, while in the case where affirmative determination is made, issues the second file access command which corresponds to the first file access command and requires only a part of the entire access amount specified by the first file access command within redundant bandwidth in order to assure guaranteed bandwidth of the high-priority file access; and an existing file system unit that receives the issued second file access command and performs file access operation on the storage unit.

* * * * *